Sept. 9, 1930.     D. L. HUNTER     1,775,128
CONDUIT COUPLING
Filed March 20, 1928
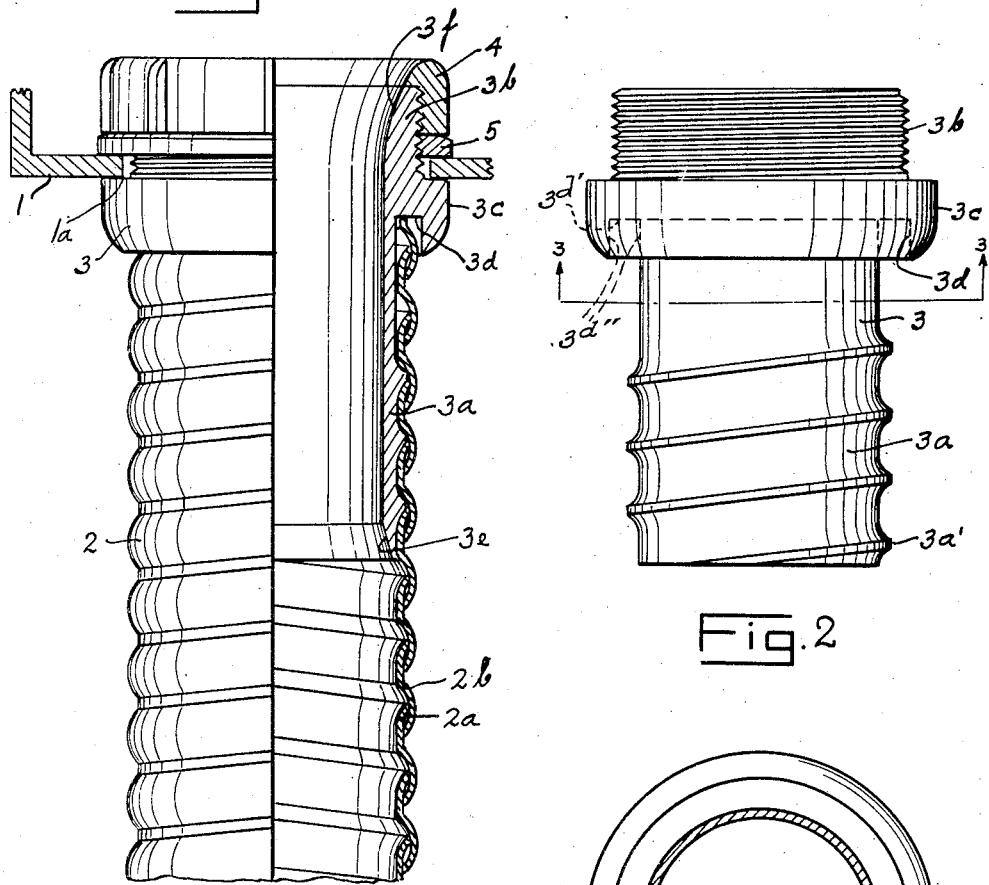
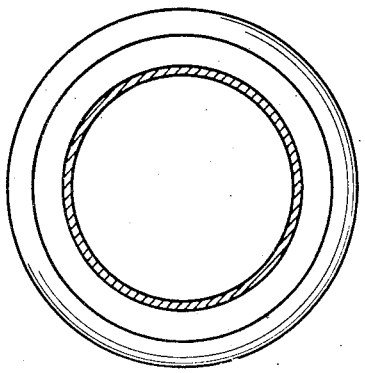
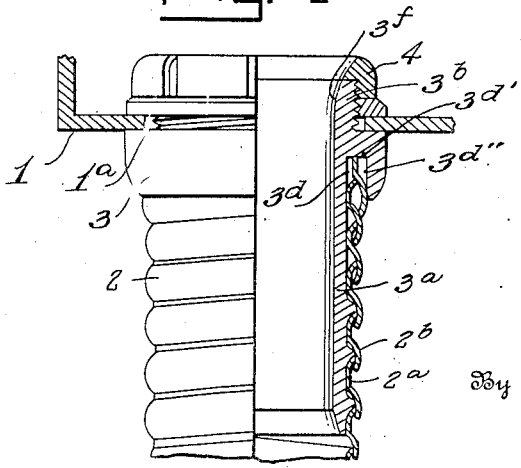

UNITED STATES PATENT OFFICE

DANIEL L. HUNTER, OF HOUSTON, TEXAS, ASSIGNOR TO HUNTER-WALKER COMPANY, OF HOUSTON, TEXAS, A CORPORATION OF TEXAS

CONDUIT COUPLING

Application filed March 20, 1928. Serial No. 263,078.

This invention relates to flexible metallic conduit couplings or connectors and has for its general object the provision of a new and improved coupling which will securely connect a flexible conduit to another element such as an outlet box or the like, and which will afford protection for the insulation of the wires.

Box connectors now in use have a bore adapted to receive a flexible metallic conduit, and means to clamp the conduit in the bore. When such clamping means are actuated, the flexible conduit is frequently so distorted as to effect separation of adjacent interlocked portions thereof, and consequent exposures of the wires therein. And the sharp end of the conduit is permitted to come into contact with the insulation of the wires, so that the insulation is cut and current is permitted to pass from the wires through the conduit to the ground, and short circuiting of adjacent wires often occurs.

The flexible metallic conduits now in common use comprise a spirally wound band, and this invention has for one of its specific objects to provide a connector adapted to be screwed into the end of such a conduit and to become automatically locked therein, the connector having means whereby it may be secured in the opening of a box or the like.

Other specific objects will hereinafter appear.

The accompanying drawings illustrate the preferred embodiment of the invention. Fig. 1 thereof is a partly sectional side elevation showing the coupling partly screwed into the conduit; Fig. 2, a side elevation of the coupling; Fig. 3, a horizontal section on the line 3—3 of Fig. 2; and Fig. 4 is an enlarged partly sectional side elevation of the coupling locked in the conduit and connecting the same to a box.

Referring more specifically to the drawings the box is shown fragmentarily at 1, the flexible metallic conduit at 2, and the coupling at 3. It will be seen that the coupling has a reduced outer end $3^a$ and a screw threaded inner end $3^b$ with an annular flange $3^c$ therebetween. The outer end $3^a$ has a thread $3^{a\prime}$ adapted to enter the internal groove of the flexible metallic conduit 2.

It will be observed that the coupling has an annular groove or chamber $3^d$ adjacent the flange $3^c$ and opening outwardly to receive and retain the end of the conduit 2. When the end $3^a$ of the coupling is screwed into the conduit, the end of the conduit will be brought into engagement with the bottom wall $3^{d\prime}$ of the chamber $3^d$ as shown by Figure 1. When the coupling is screwed further into the conduit, after the forward movement of the end of the conduit has been arrested by the engagement just referred to, the conduit will be longitudinally contracted by its creeping movement inwardly on the coupling, so that the end of the conduit will be circumferentially expanded into locking engagement with the side walls $3^{d\prime}$ and $3^{d\prime\prime}$ of the chamber $3^d$. This is shown clearly by Figure 4.

Attention is also invited to the peculiar shape of the conduit thread $3^{a\prime}$. It has rounded flanks or sides to conform to the peculiar internal surface of the band forming the conduit. When the coupling is screwed into the conduit, the rounded flanks or sides of the thread $3^{a\prime}$ force the portions $2^a$, that is the inner edge of the conduit, outwardly. After the conduit 2 has been locked on the outer end $3^a$ of the coupling, the inner end $3^b$ may be passed through the opening $1^a$ of the box and the nut 4 screwed thereon to hold it in the box. If desired, a lock nut or washer 5 may also be used.

It will be seen from the foregoing that the invention provides a rigid connection between a box and a conduit. It will also be observed that the end of the conduit 2 is completely concealed in the annular chamber $3^d$, so that the device is not only a serviceable one, but comprises few parts having a most attractive appearance.

The electric wires passing through the conduit into the box are completely separated from the end of the conduit, and all danger of leaks and short circuits caused by wearing of the insulations is thereby eliminated.

The standard conduit, however, is an electrical conductor, and the engagement of the expanded end portion of the conduit and the chamber walls of my coupling, as above described, effects a perfect electrical connection between the coupling and the conduit, so that if one of the wires passing through the conduit should be broken at any point remote from my coupling, the current will be safely grounded from the conduit through my coupling into the box to which it is attached. I regard this as an important feature of my invention, because the couplings now in use do not provide a proper electrical connection of a conduit and a box or the like, and so permit current to jump from the conduit to the ground and thereby endanger surrounding objects.

Attention is further invited to the fact that the outer end of the coupling is flared as indicated at 3$^e$ and the inner end, as indicated at 3$^f$. The wires will therefore not be pinched between the outer end and the conduit, nor will the insulation be worn by the inner end.

Various features and advantages of this new and improved coupling will be at once apparent to those skilled in the art.

I claim:

1. A coupling for a flexible metallic conduit comprising a spirally wound band, said coupling comprising a tubular body having an external conduit thread, and an annular chamber to receive and retain the end of said conduit.

2. A coupling for a flexible metallic conduit comprising a spirally wound band, said coupling having a threaded inner end, an external conduit thread on its outer end, a flange between its ends, and an outwardly opening annular chamber adjacent said flange to receive and retain the end of said conduit.

3. A coupling for a flexible metallic conduit comprising a spirally wound band, said coupling having a threaded outer end adapted to be screwed into said conduit, a bore flared adjacent said end, a flange between its ends, and an annular chamber adjacent said flange to receive and retain the end of the conduit.

4. A coupling for a flexible metallic conduit comprising a spirally wound band, said coupling comprising a tubular body having a flange forming an inwardly presented shoulder, threads extending inwardly from said shoulder, an annular outwardly opening chamber adjacent said flange, and a conduit thread extending outwardly from said chamber.

5. A coupling for a flexible metallic conduit comprising a spirally wound band, said coupling having an annular chamber for the reception and retention of the end portion of a conduit, and an external conduit thread, one flank of said thread being rounded.

6. A conduit coupling having an external thread and an annular chamber for the reception and retention of the end of a conduit, said chamber having a greater depth than width.

7. The combination with a flexible metallic conduit comprising a spirally wound band constructed to circumferentially expand when longitudinally contracted, and forming an internal groove, of a coupling having an external thread fitting in said groove, and an annular chamber, the end portion of said conduit being expanded into locked engagement with the walls of said chamber, substantially as set forth.

8. The combination with a flexible metallic conduit comprising a spirally wound band substantially S-shaped in cross-section, adapted to circumferentially expand when longitudinally contracted, and forming an internal groove, of a coupling having an external thread fitting in said groove, and an annular chamber, the end portion of said conduit being expanded into locked engagement with the walls of said chamber, substantially as set forth.

9. The combination with a flexible metallic conduit comprising a spirally wound band substantially S-shaped in cross-section, adapted to circumferentially expand when longitudinally contracted, and forming an internal groove, of a coupling having an external thread fitting in said groove, and an annular chamber, the end portion of said conduit being longitudinally collapsed and circumferentially expanded into locked engagement with the walls of said chamber, substantially as set forth.

10. The combination with a flexible metallic conduit comprising a spirally wound band adapted to circumferentially expand when longitudinally contracted, and having an internal groove, of a coupling having an external thread in said groove, said coupling also having an annular chamber into which the end portion of said conduit extends; said chamber having a bottom wall against which the end of said conduit abuts, and side walls with which the end portion of said conduit is in locked engagement.

11. The combination with a flexible metallic conduit comprising a spirally wound band adapted to circumferentially expand when longitudinally contracted and having an internal groove, of a coupling having an external thread and an annular chamber, said coupling being automatically locked in said conduit by the engagement of said thread in said groove, and the engagement of the end portion of said conduit with the walls of said chamber, substantially as set forth.

12. The combination with a flexible metallic conduit comprising a spirally wound band adapted to serve as an electrical conductor and to circumferentially expand when longitudinally contracted, and having an internal groove, of a coupling comprising a metallic body adapted to serve as an electrical conductor and having an external thread in said groove, and an annular chamber, the end portion of said conduit being expanded into a metal to metal contact with the walls of said chamber to electrically connect and lock the conduit and coupling together.

In testimony whereof, I hereunto affix my signature.

DANIEL L. HUNTER.